Feb. 13, 1923.

R. MORESCHINI 1,445,535

BEET HARVESTER

Filed Dec. 8, 1919

5 sheets-sheet 2

Patented Feb. 13, 1923.

1,445,535

UNITED STATES PATENT OFFICE.

RONALD MORESCHINI, OF PUEBLO, COLORADO.

BEET HARVESTER.

Application filed December 8, 1919. Serial No. 343,217.

*To all whom it may concern:*

Be it known that I, RONALD MORESCHINI, a citizen of the United States, residing at Pueblo, in the county of Pueblo and State of Colorado, have invented certain new and useful Improvements in Beet Harvesters, of which the following is a specification.

My invention relates to machines more particularly intended for the harvesting of beets. The object of my invention is to provide a unitary structure capable of lifting the beets from the ground, elevating them to a crowning mechanism and delivering them to a suitable receptacle.

Figure 1:
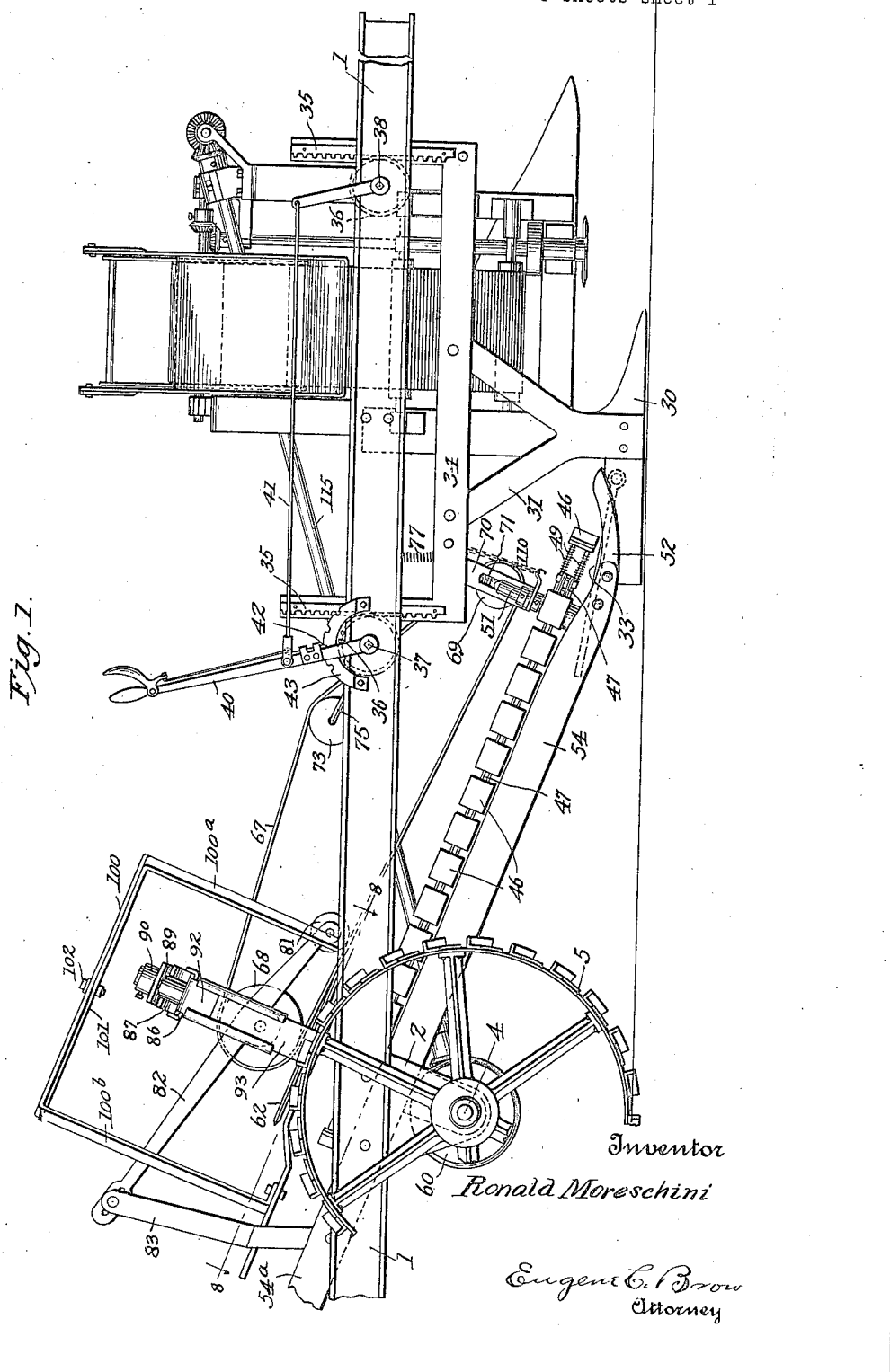
Figure 2:
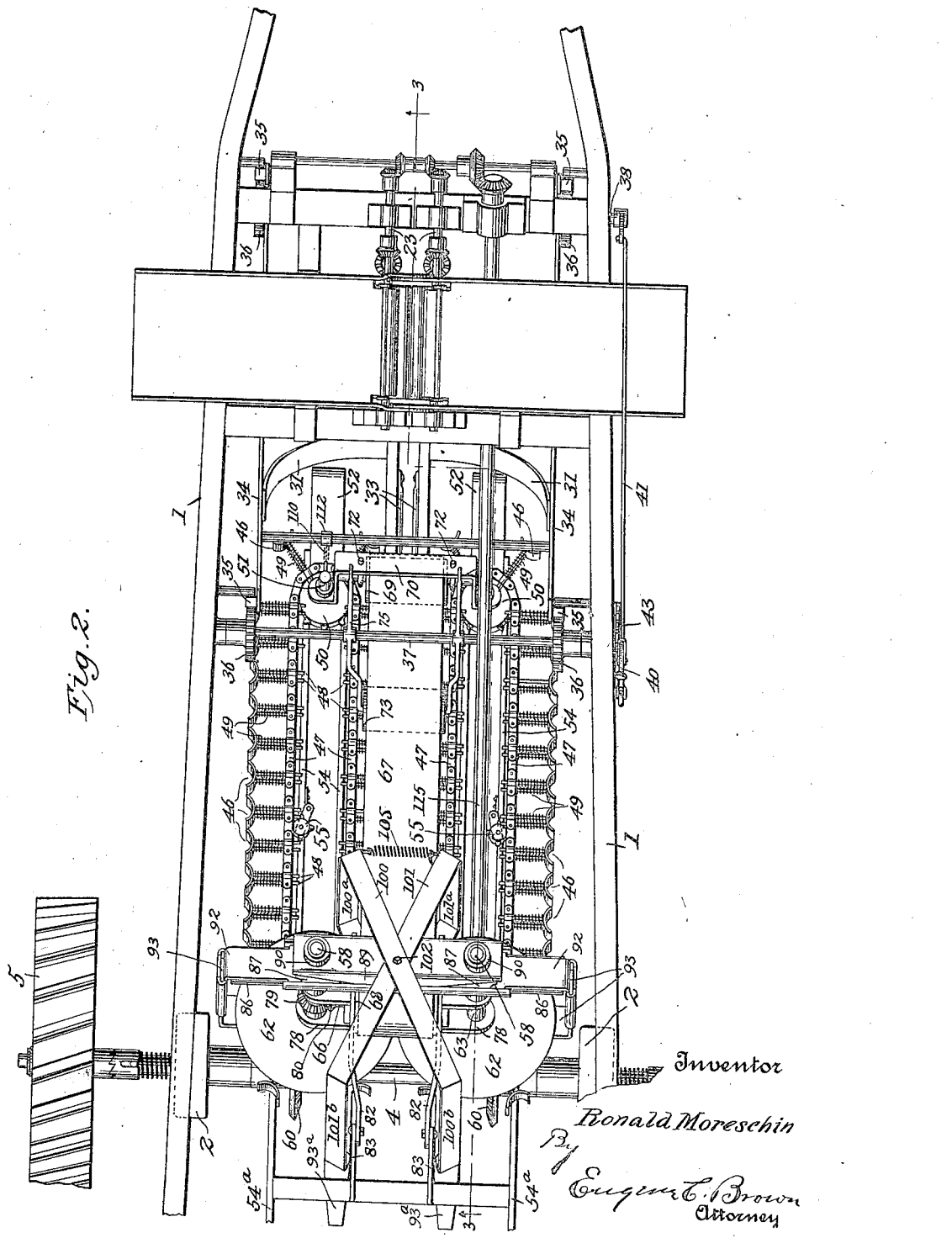
Figure 3:
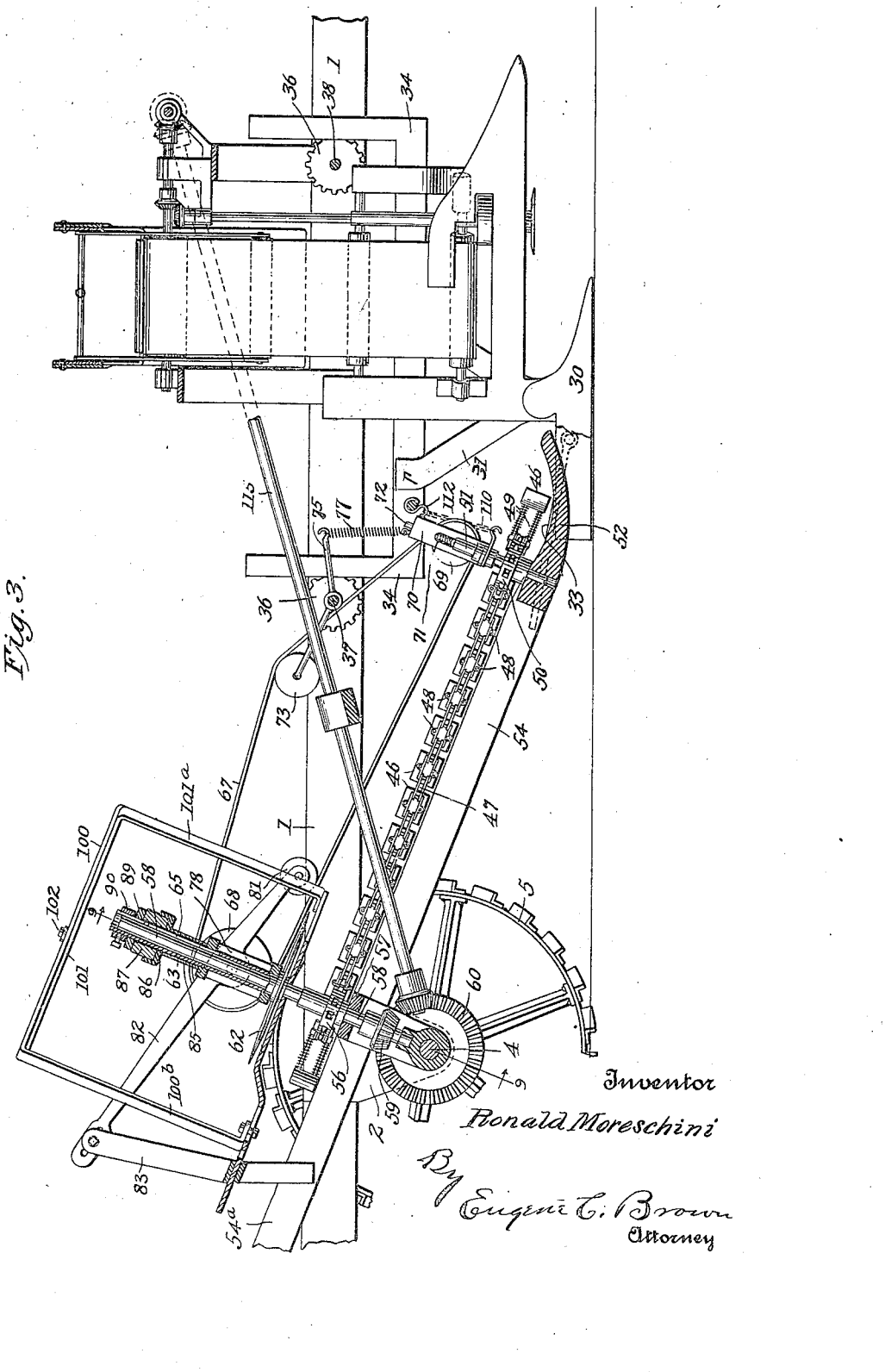
Figure 4:
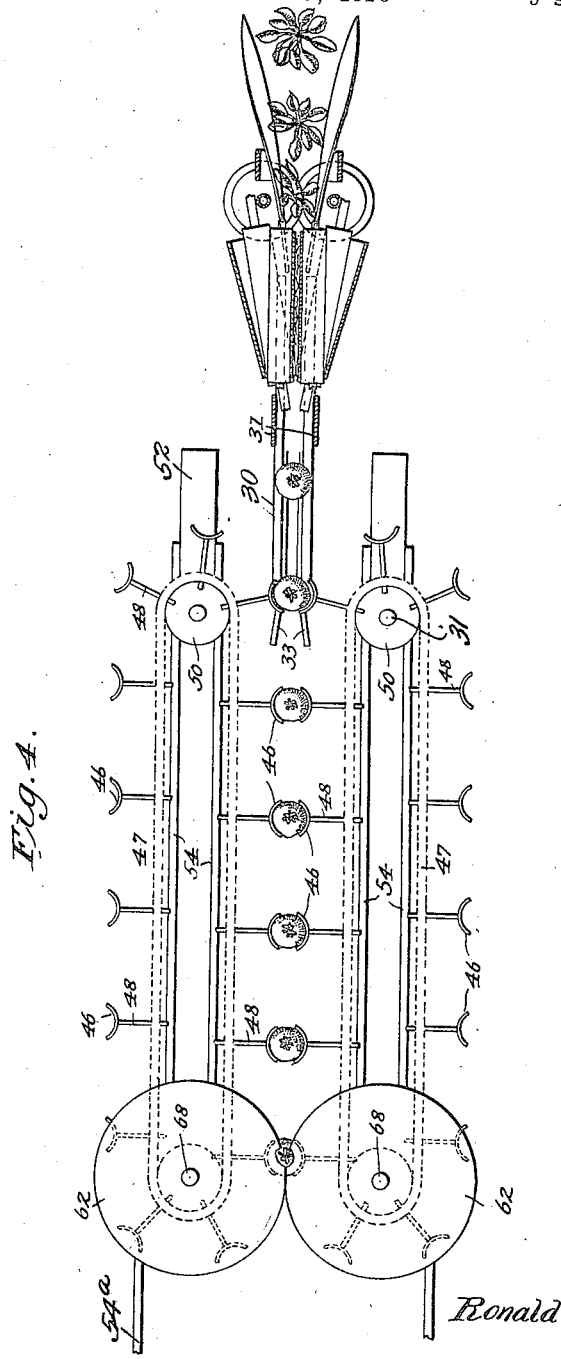
Figure 5:
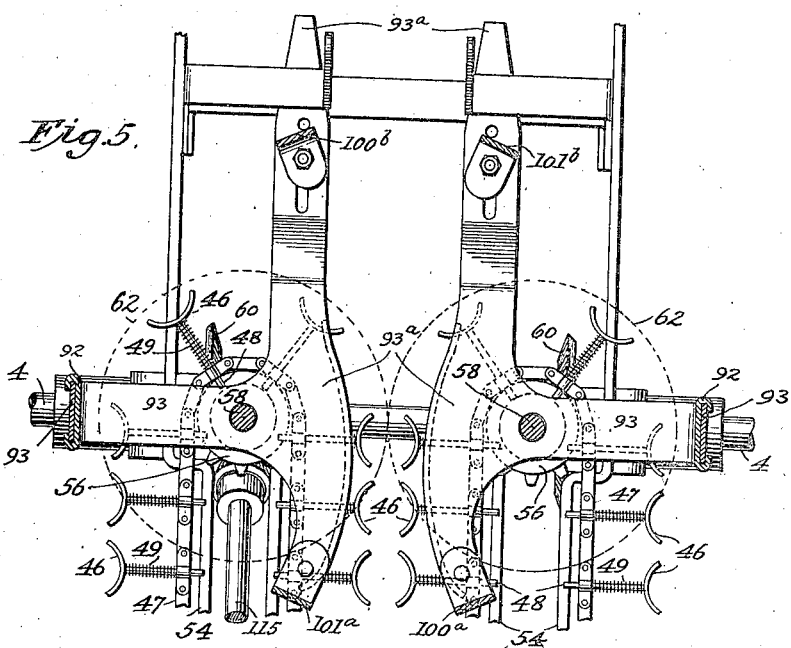
Figure 6:
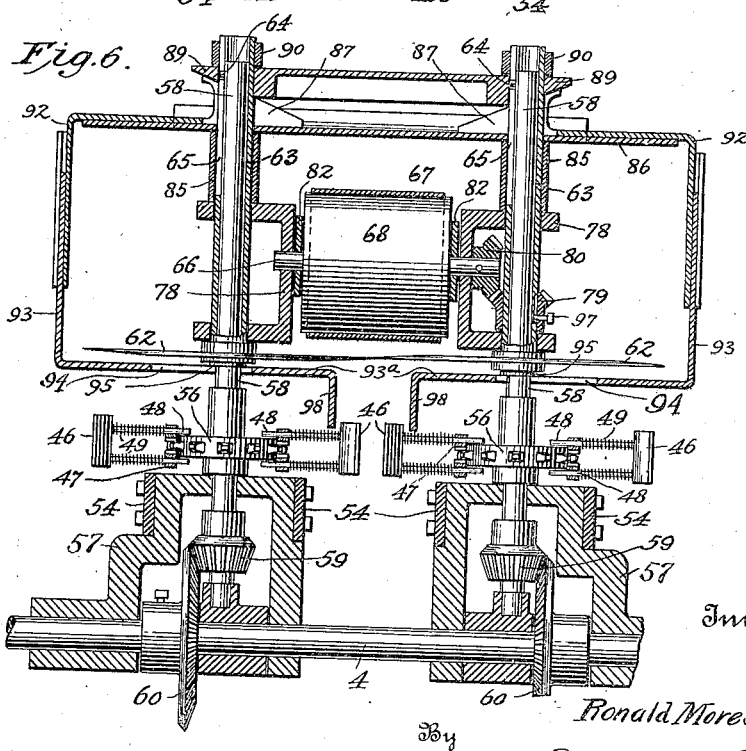

In the description which follows I shall refer to the accompanying drawings, in which Figure 1 is a side elevation of a beet harvester embodying my invention; Fig. 2 is a top plan view thereof; Fig. 3, is a vertical longitudinal sectional view on the line 3—3 of Fig. 2; Fig. 4 is a top plan view of a conventional illustration of the topping, digging and conveying mechanism, the springs surrounding the stems 48 being omitted for the sake of clearness; Fig. 5 is an enlarged detail view on the line 8—8 of Fig. 1; and Fig. 6 is an enlarged vertical sectional view on the line 9—9 of Fig. 3.

The main supporting frame of the machine comprises structural steel bars 1, preferably channel bars to which are secured bearing blocks 2 for the axle 4 of the tractor wheels 5, the forward ends of the frame bars converging into a platform to which suitable front steering wheels, not shown, may be pivotally secured in the usual manner.

The plow which loosens the soil and uproots the beets after they have been topped consists of two members 30, spaced slightly apart and each carried by a bracket 31, depending from a frame 34, which is provided at each end with vertical rack bars 35 at each side. These four racks are engaged by gears 36, secured in pairs to pintle rods 37, 38 pivotally mounted in the main frame 1 and which are actuated by the hand-lever 40 to raise and lower the frame 34. The front and rear pairs of gears are connected to move simultaneously by the connecting link rod 41.

As the beets are lifted by the plow 30, they are guided by the rods 33, between the grippers which are carried by the links 47 of the endless chain conveyors. Each gripper comprises two concave gripping plates or fingers 46, carried by the two endless chains and which grasp the beets from opposite sides, as each mating pair of grippers is brought over the plow members. The plates are slidably mounted upon pairs of rods 48 secured to the links and are yieldingly held by springs 49. They will thus yield to conform to different sizes of beets, so that the latter will not be bruised as they are conveyed upwardly from the plows.

The forward end of the chains pass over idler sprockets 50, journaled on stub shafts 51 carried by shoes 52, the latter being secured between pairs of beams 54 extending forwardly from the yoke brackets 57, swiveled on the rear axle 4. The outer members of the beams 54 are provided with rearward extensions 54ª.

The rear chain driving sprockets 56 are secured to shafts 58, mounted in brackets 57 and carrying upon their lower ends bevel pinions 59 which mesh with bevel gears 60 carried by the main drive axle 4. Slack in the chain may be taken up by the adjustable sprockets 55.

After the beets have been topped of their leaves, it is desirable that a small portion of the crown of the beet should be removed, but this should be done accurately and gauged in accordance with the sizes in order to avoid waste. I provide crown cutters 62 carried by sleeves 63, which are slidable on the shafts 58, but are driven thereby by means of pins 64 projecting from the shafts and passing through slots 65 in the sleeves.

In order to gauge the amount that shall be cut from the crown of the beets and to vary the cut according to the size I provide governing mechanism which automatically adjusts the distance of the crown cutters 62 from the grippers 46. This mechanism comprises an endless belt 67 which passes over the drive pulley 68 at the rear end and over an idler roller 69 at the front end, the pintle rod of the latter passing through slots in the arms of a yoke support 70 secured to the stub shafts 51. In order that the roller 69 may yield upwardly to permit the passage of a large beet or one which stands high from the grippers, the pintle of the roller is yieldingly forced downwardly in the slotted yoke arms by springs 71 which surround the stems of I-bolts 72 which extend through holes in the bridge of the yoke 70, the eyes of the bolts surrounding the pintles. The belt is maintained taut by an idler roller 73 carried by levers 75, pivotally mounted on the gear pintle 37 and yieldingly held by springs 77 attached to the yoke 70.

The pintle 66 of the driving pulley 68 is mounted in yoke brackets 78 which are carried by the sleeves 63, the pulley being driven from said sleeve by means of the gears 79, 80. A gauging roller 81 is carried by a pair of lever arms 82 which are pivoted at their rear ends by pin and slot connections to standards 83, the latter being bolted to the frame bars 54ª. The pintle rod of the pulley 68 extends through the lever arms 82 so that it will move with the lever arms.

The gauge roller bears against the belt 67 just in front of the cutters 62. The lower side of the belt engages the tops of the beets and travels with them as they are conveyed by the gripper chains. As the beets pass under the gauge roller 81, they lift it varying amounts depending upon the height of the beet from the gripper. The upward movement of the lever arms 82, carries the pulley 68 and the yoke brackets 78, and the latter presses upwardly upon the thimbles 85, guide plate 86, wedge blocks 87 and head plate 89, the latter bearing upon the nuts 90 which are threaded on the ends of the driving sleeves 64. It is evident, therefore, that when the gauge roller 81 is lifted by the passage of the beets thereunder, the movement will be transmitted through the several engaging parts to the upper ends of the sleeves 63, thereby sliding the latter upwardly on the shafts 58 and elevating the cutters 62 a corresponding amount above their normal position with respect to the grippers. In this manner the amount which will be cut from the crown of each beet is accurately gauged or governed.

While the above-described gauging mechanism serves to regulate the amount cut from the beets due to varying lengths and irregularity in height above the grippers, I have found that large beets require a larger amount to be cut from the crown and hence I have provided means for causing a thicker cut to be made on the larger beets. For this purpose I provide means for automatically sliding the split wedges 87 outwardly to thereby permit the yoke brackets 78 and thimbles 85 to slide upwardly on the sleeves 63 a certain distance before the head plate 89 is pressed against the end nuts 90. The wedges 87 are secured to angle arms 92, the depending portions telescopically engaging the upright arms of brackets 93, the latter being provided with slots 94 which permit lateral movement but are restrained from vertical movement by collars 95 on the shaft 58. The gear 79 is slidable on the sleeve 63, but is keyed for driving connection therewith by means of a pin 97 entering a slot in the sleeve, thereby permitting the gear to slide along the sleeve when the yoke brackets 78 are moved upwardly by the levers 82 at the time the wedges 87 have been moved outwardly.

The inner ends 93ª of the brackets 93 are provided with depending guide portions 98, the inner faces of which lie one upon each side of the beets as they pass the cutters. The forward ends of these guide members 98 are flared outwardly to permit the ready entrance of the grippers with the beets. When a pair of grippers holding a large beet passes between the guide members, the outer sides of the grippers force the guides apart, sliding the bracket arms 93 outwardly and thereby causing the arms 92 to separate the wedges 87 to a greater distance and permitting the head plate 89 to drop below the end nuts 90. Accordingly, the lifting action exerted on the levers 82 as the beet passes under the gauge roller 81, first causes the pulley 68, and yoke brackets 78 to move upwardly away from the cutters 62, an amount depending upon the distance the wedges 87 have been slid outwardly, until the head plate 89 comes into contact with the end nuts 90 and then the cutters move along with the pulley. This initial spacing movement of the gauge roller 81 and pulley 68 from the cutters, permits a thicker slice to be cut from the larger beets in proportion to their size.

For the purpose of causing each of the guide flanges 98 to move outwardly an equal distance and to maintain their parallel relation and prevent any torsional strains between the telescoping portions of the arms 92 and 93, I connect the front and rear ends of the portions 93ª, by means of a parallel movement device. This consists of two crossing horizontal members 100, 101, pivotally connected at 102 where they intersect, each having vertical legs 100ª, 100ᵇ, and 101ª, 101ᵇ respectively. One or more springs 105 tend to maintain the members 93ª and their depending flanges 98 in their inner positions, so that after the passage of each beet the parts will be restored to normal or initial positions.

As the beets leave the cutters 62, they may be received by a chute or conveyor which delivers them to a wagon or to a receptacle as illustrated in my prior Patent No. 1,366,477 dated January 25, 1921, or in any other well known manner. It is also evident that the beet crowns may be delivered in a similar manner.

The bars 54 which carry the endless conveyor chains and the crown cutting mechanism are pivotally mounted on the rear axle 4, by means of the yoke brackets 57 and these parts may be rocked about the axle and secured at desired inclination, to correspond with any particular elevation of the plow by means of the chains 110 attached to the pintle rods 51, and adjustably secured to hooks 112 secured to the frame 34.

The operation of my beet harvester will be understood from the foregoing detailed description of the parts of the machine. The frame 34 is first adjusted by the lever 40 to bring the plow to the proper elevation and the frame of the endless gripper conveyors is then correspondingly adjusted by means of the chains 110. As the machine is drawn or propelled across the field, the topped beets are loosened and lifted by the plow 30 and are separated from the earth as they move along the guide rods 33 and are grasped by the grippers 46, which carry them under the crown cutters and deposit them in a suitable chute, receptacle or conveyor as desired. The crown cutters are adjusted in elevation to correspond with the height of each beet as it passes under the gauge roller 81, while a thicker cut is automatically made upon large size beets in proportion to their size.

I claim:—

1. In a beet harvesting machine, a crown cutting mechanism, conveying mechanism for carrying the topped beets beneath said cutting mechanism, an endless belt movable over said conveying mechanism and adapted to bear upon the beet crowns, and means cooperating with said belt for automatically adjusting the crown cutting mechanism in accordance with the dimensions of the beets.

2. In a beet harvesting machine, a crown cutting mechanism, a gauge for the height of the beets comprising an endless belt engaging the beet crowns, and means cooperating with said belt and actuated by virtue of the size of the beet for regulating the position of the cutter.

3. In a beet harvesting machine, a crown cutting mechanism, a conveyor for carrying topped beets thereunder, and means for automatically adjusting the position of said cutting mechanism in accordance with the dimensions of the beet comprising a pulley revolubly mounted above the cutter, and adapted to engage the crown of the beet, and means adapted to be separated laterally by engagement with the sides of the beet.

In testimony whereof I affix my signature.

RONALD MORESCHINI.